United States Patent [19]
Stein

[11] 3,708,906
[45] Jan. 9, 1973

[54] FISH ATTRACTING MEANS
[76] Inventor: Julian Stein, 338 Fairway Drive, Franklin Square, N.Y. 11010
[22] Filed: Jan. 11, 1971
[21] Appl. No.: 105,473

[52] U.S. Cl.....................43/100, 43/17.6, 43/27.4
[51] Int. Cl...............................................A01k 69/00
[58] Field of Search......43/4, 4.5, 6.5, 26.2, 15, 17.1, 43/17.6, 26.1, 26.2, 27.2, 27.4, 100, 102, 42.74, 44.84, 44.85

[56] References Cited

UNITED STATES PATENTS

| 523,561 | 7/1894 | White | 43/27.4 |
| 1,717,835 | 6/1929 | Calhoun | 43/6.5 |

FOREIGN PATENTS OR APPLICATIONS

| 1,057,929 | 11/1953 | France | 43/6.5 |
| 30,372 | 2/1920 | Norway | 43/4 |
| 32,610 | 7/1921 | Norway | 43/4 |

*Primary Examiner*—Warner H. Camp
*Attorney*—James P. Malone

[57] ABSTRACT

A recirculating cable on which is mounted a plurality of lures is mounted on a plurality of driven pulleys. The fish are attracted by the traveling lures into the area in front of the mouth of a fish trap or directly into a fish trap. The return path of the recirculating cable is covered with a shield to discourage fish from swimming away from the trap area. Various types of lures may be used.

12 Claims, 5 Drawing Figures

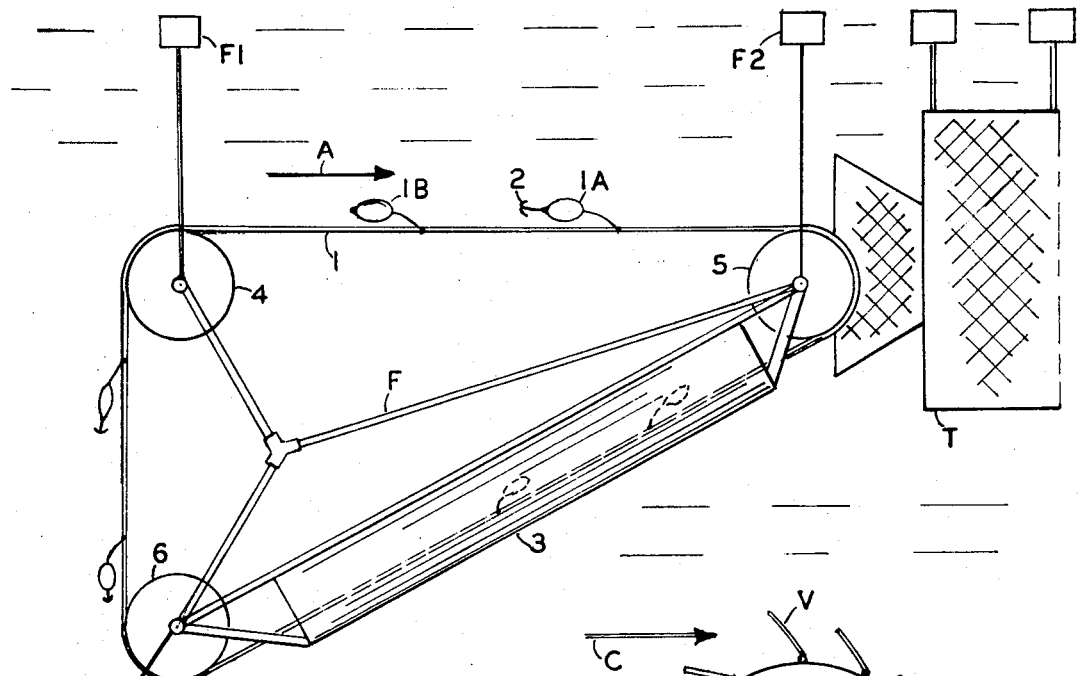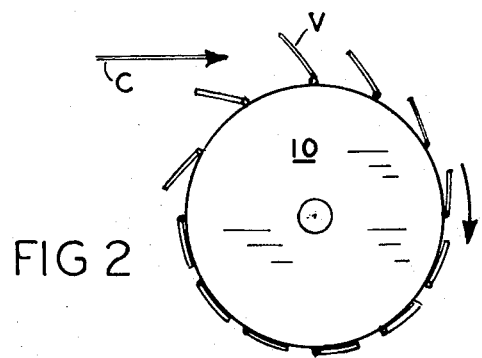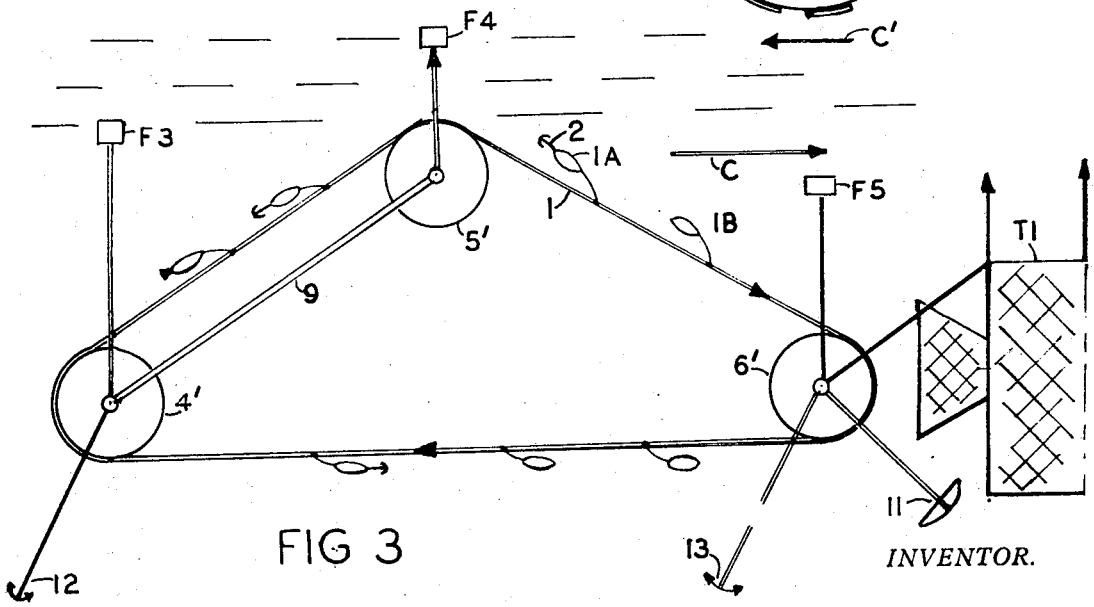

FISH ATTRACTING MEANS

This invention relates to fish attracting means, and more particularly, means to attract fish into the mouth of a fish trap.

This application is an improvement of and supplements my U.S. Pat. No. 3,494,064, granted Feb. 10, 1970, entitled FISHING TRAP, and my copending application, Ser. No. 9,539, filed Feb. 9, 1970, entitled FISHING TRAP and now U.S. Pat. No. 3,638,346.

My above mentioned patents describe fishing traps. The present invention is directed towards means for attracting fish towards the traps and into the area adjacent the mouth of the traps or directly into a fish trap.

The general technique of the invention is to have a recirculating cable mounted on driven pulleys. The cable carries a plurality of fish lures. A trap is mounted adjacent one of the pulleys so that as the fish follow the lures, they are attracted into the mouth of the trap. The return portion of the recirculating cable is preferably shielded to minimize the chance of fish being attracted away from the trap area. Alternatively, the cable may pass through a fish trap.

Accordingly, a principal object of the invention is to provide new and improved means of attracting fish to a predetermined area.

Another object of the invention is to provide new and improved means for attracting fish into a fish trap.

Another object of the invention is to provide a fish trap and means to attract the fish towards said trap.

Another object of the invention is to provide new and improved means for attracting fish to a predetermined area, comprising a plurality of spaced pulleys, a continuous cable mounted on said pulleys, means connected to drive at least one of said pulleys, and fish lure means connected to said cable.

These and other objects of the invention will be apparent from the following specification and drawings, of which:

FIG. 1 is a side perspective view of an embodiment of the invention.

FIG. 2 is a detail view of a current motor.

FIG. 3 is a side view of a modification of the invention without a frame.

Figure 4:
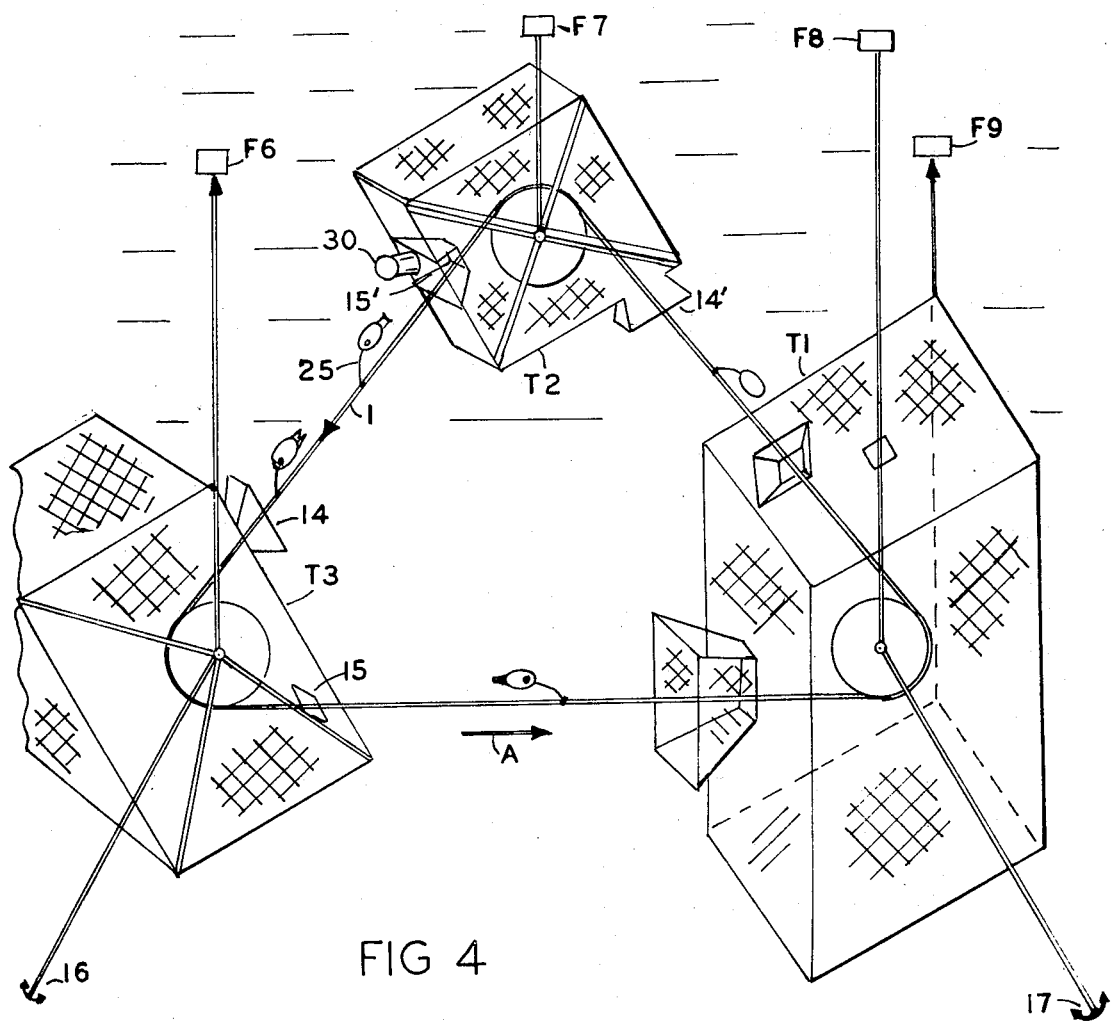
FIG. 4 is a side view of another modification of the invention.

Referring to FIG. 1, the invention generally comprises a plurality of spaced pulleys 4, 5, 6 which are mounted on a rigid frame F, which may be of aluminum pipe. A continuous cable 1 is mounted to travel around the pulleys. One or more of the pulleys may be driven by conventional motor means which may be an electrical or hydraulic motor or a motor operated by the ocean currents, as shown in FIG. 2. The assembly is mounted by means of floats F1 and F2, the buoyancy of which, and the length of the connecting lines of which are chosen to float the assembly at a predetermined depth. The assembly is preferably anchored by means of an anchor 10'. The float and anchor lines are preferably swivel connected to prevent tangling. The direction of the current flow is shown by the arrow A. The circulation path includes a section moving in the planned direction A. This section is left open for fish to detect by senses such as sight or smell. Another portion of the recirculation path moves in a direction which leads away from the planned direction. This section is shielded from the fish senses such as sight and smell by shield 3. The hollow sheath 3 encloses the cable 1 between the pulleys 5 and 6, namely on the return portion of the cable travel. A fish trap T is mounted adjacent to the pulley 5. The fish trap may be as shown in my above mentioned patents.

A plurality of lures 1B, 1A, etc. are attached to the cable. The lures may be artificial fish, with or without hooks attached, or they may be baited fish hooks or chum dispensing pots. The series of moving lures alone will direct some fish. In addition, when some fish attempt to bite the lure, they are likely to be caught on the hook 2 and be pulled along with the lure. The hooked fish serve as recirculating bait, or chum, a highly effective natural means of attracting and directing fish in a particular direction as planned. Alternatively, bait or chum pots may be attached to the cable.

The operation of the device is as follows: One or more pulleys are driven so as to drive the cable 1 in the direction shown by the arrows, thereby pulling the lures in the direction of the cable. This action will tend to attract fish into the vicinity of the trap T where they may be entrapped. The purpose of putting fish hooks on the lures is to possibly catch small fish which are used as lures themselves, since they will not find their way into the trap. The purpose of the sheath or shield 3 is to discourage fish from following the lures away from the trap area.

FIG. 2 shows a typical current motor which is a cylindrical body 10 anchored with its axis parallel the surface of the water and connected to drive one or more pulleys. The body 10 contains a plurality of vanes V all extending in the same direction. The vanes exposed to the current C will open up and cause the motor to run clockwise, as shown by the arrow. On the bottom of the motor 10, the vanes will collapse against the side of the body so as to afford minimum resistance to the rotation of the motor.

If the current should reverse to the direction C', the current motor would continue to rotate clockwise, and the lures would continue to be pulled in the planned direction towards the trap. Thus, daily tidal reversals of current flow could be used in both directions.

Referring to FIG. 3, there is shown another embodiment of the invention having a plurality of rollers or pulleys 4', 5', 6'. These rollers are not supported by a frame. The rollers 4' and 5' are connected by a connecting cable 9 and the roller 6' is connected to a sea anchor 11 and/or a conventional anchor 13. The whole assembly is anchored by means of the anchor 12 and is supported at a predetermined depth by means of the floats F3, F4 and F5. The cable 1 contains the lures 1A, 1B, etc. as in the embodiment of FIG. 1. One or more of the pulleys is similarly motor driven by means of a conventional motor. A fish trap T1 is mounted adjacent to pulley 6'.

This embodiment operates in the same manner as the embodiment in FIG. 1 with the lures being pulled into the area of the fish trap. If desired, a shield similar to the shield of FIG. 1 may be added.

FIG. 4 shows another embodiment of the invention having the same pulley arrangement as FIG. 3 and the same trap T1. In addition, this embodiment has two additional fish traps T2, T3 through which the cable 1 passes. More specifically, the cable 1 passes through an entrance 14 in the trap T3 and around the pulley and then out a restricted exit 15. The trap T2 mounted on the upper pulley also has a relatively large entrance 14' and a restricted exit 15'.

In this arrangement, the fish are lured into the traps T2 and T3. However, they will have difficulty in swimming out of the traps due to the restricted exits 15 and 15'. The entire assembly is held up by floats F6, F7, F8 and F9, and may be anchored, if desired, in conventional manner by means of anchors 16 and 17. The trap T1 is the same as in FIG. 3. This embodiment has the following cost effective advantages:

1. One drive system servicing three fish traps.
2. Elimination of the frame.
3. Eliminating the need for a shield.
4. Long lines between traps are possible.
5. Different water levels are harvested.

The need for shields is eliminated because all lines lead towards or into traps.

Deterrents for keeping the fish in a trap may be provided and may include electrical, chemical, light hydraulic, or sonic repelling devices. For example, a short range, weak, highly directional sonic repelling device 30, as shown in FIG. 4, will repel fish from the restricting passage. Note all pulleys or other openings must be designed with sufficient clearance for typical bait fish. The lures are designed for the reasonable size bait fish which can pass through all openings along the recirculation path. Should a very large fish happen to be hooked inadvertently, the only damage that would be sustained is the breakage of the lure line. The lure connecting lines are preferably much weaker than the recirculating cable. If the fish did not break away itself, but was too large to pass through an opening, the pull on the recirculating line 1 would be sufficient to easily break the lure line 25. Thus only one lure would be lost, and a preponderance of lines would remain.

The three fish traps shown in FIG. 4 are located a large distance from each other and at different levels. As the cable circulates in the direction A, fish along the large distance between traps are attracted by the lures. They follow the lures into the intake guide of the traps. Each of the traps is held in place by an anchor line and floats. The anchor lines pull the trap down and away from each other. The floats pull up. The cable prevents the traps from being pulled away from each other. The outward pull of the anchor lines is balanced by the tension forces in the cable applied to pulley wheels. This keeps tension on the lines.

Figure 5:
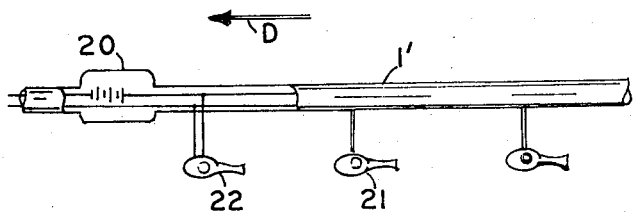
FIG. 5 is a detail view of another modification of the invention.

FIG. 5 shows a detail view of an arrangement for providing lighted lures. In this case, the cable 1' is an electric cable having a battery 20 incorporated in the cable structure. The lures 21, 22, etc. contain electric lights which are energized by the battery 20.

It has been established that many artificial objects are attractive to fish. Often these lures have some similarity in appearance to some natural live source of food. Other successful fish lures are obviously artificial looking to man. Often the lure is only an attractive symbol with no more natural significance than the movement of a red cloth conveys to a bull. If the lure is lighted, it may have an artificial appearance, but it conveys the attractive symbol for a larger range. Lighted fish lures in shapes, colors and sizes known to be attractive to fish will be used. The source of light may be electrical or phosphorescent.

FIG. 5 shows a series of electrically lighted fish lures. Electrical power lines supply power to the electric light bulbs. The external body of a lure is made of a transparent or translucent material with a color attractive to fish. The body may have an attractive pattern on its outer surface.

The electrically lighted lures may be on constantly or may be turned on and off as a group, or in a sequence. The sequence may be random or may be in an order which presents the illusion of motion in a specified direction. For example, if the sequence is lure 21, then lure 22, etc., the illusion of movement in the direction D is created. This illusion of movement is expected to lead fish in the direction A towards a fish trap or a favorable fish environment outside of a trap. Fish in the favorable environment can be driven into the trap by sonic devices and an intake guide.

Sequenced lighted lures can be expected to conserve power and be more effective than continuously lighted lures. Actual movement, or the illusion of movement will be used. This will be more effective in attracting fish in a desired direction of planned movement.

I claim:

1. Means for attracting fish to a predetermined area comprising:
   recirculation means to continuously recirculate along a predetermined underwater path,
   fish lure means connected to said recirculation means,
   and means connected to drive said recirculation means,
   a fish trap mounted underwater adjacent to said recirculation means whereby fish are attracted by said lure means to the vicinity of said trap.

2. Apparatus as in claim 1 wherein said recirculation means includes a plurality of spaced pulleys and a continuous cable mounted on said pulleys, said drive means being connected to drive at least one of said pulleys, and said fish lure means being connected to said cable.

3. Apparatus as in claim 2 having means to shield said cable over a portion of its travel.

4. Apparatus as in claim 2 having a frame to mount said spaced pulleys.

5. Apparatus as in claim 1 having a plurality of fish traps, each mounted at locations spaced along said recirculation path.

6. Apparatus as in claim 1 wherein said fish lure means are baitable.

7. Apparatus as in claim 1 wherein said fish lure means comprise lures with fish hooks attached.

8. Apparatus as in claim 1 wherein said fish lure means comprise lighted lures.

9. Apparatus as in claim 8 whereby the sequence of lighting causes the illusion of motion to attract fish to a predetermined area.

10. Apparatus as in claim 1 having a fish trap underwater and enclosing a portion of said recirculation means.

11. Apparatus as in claim 10 having an exit in said trap and deterrent means adjacent the exit of said trap.

12. Apparatus as in claim 1 having means to drive said recirculation means using power derived from water currents.

* * * * *